Oct. 27, 1970   D. D. CASPERSON ET AL   3,536,343

SCRAP PREHEAT HOOD

Filed Feb. 14, 1969

INVENTORS.
Dariell D. Casperson
Michael G. Olah
Frank B. Pantano

BY Webb Burden Robinson & Webb

THEIR ATTORNEYS

United States Patent Office 3,536,343
Patented Oct. 27, 1970

3,536,343
SCRAP PREHEAT HOOD
Dariell D. Casperson, Pittsburgh, and Michael G. Olah and Frank B. Pantano, Bethel Park, Pa., assignors to The R. L. Clark Corporation, Pittsburgh, Pa., a corporation of Pennsylvania
Filed Feb. 14, 1969, Ser. No. 799,313
Int. Cl. C21d 1/06
U.S. Cl. 266—5            6 Claims

ABSTRACT OF THE DISCLOSURE

A two-zone scrap preheat hood having a cylindrical combustion chamber positioned above a heat transfer chamber. A circular baffle extends upwardly about an opening in the floor of the combustion chamber. The opening communicates the combustion chamber with the heat transfer chamber. Burners are positioned through the walls of the cylindrical combustion chamber to direct their flames between the baffle and the inner cylindrical wall of the combustion chamber. The baffle prevents any direct flame impingement into the heat transfer chamber.

---

Our invention relates to a scrap preheat hood and more particularly to a scrap preheat hood having an integral but separate combustion chamber.

With the constant demand for increased productivity, steelmakers across the land have sought ways to reduce the amount of time necessary to make a given heat of steel. One of the many considerations which has proven successful in reducing heat time is the preheating of the scrap prior to charging into the metallurgical furnace. The preheating of scrap also reduces the heating cost of the steelmaking unit itself. In the case of electric steelmaking, the cost savings from preheating scrap are appreciable since the electric power costs in the furnace for initially heating the scrap are appreciably higher than the conventional heating means currently employed for preheating. For example, it has been found that heating scrap to 1500° F. by combustion means such as natural gas or fuel oil before charging into the furnace results in appreciable cost savings as compared to the power costs of the electric furnace in doing the same. In addition, the scrap charge has about half of the total heat required for melting and processing. Therefore, there has been a substantial time savings which also further decreases the cost of the overall operation.

However, the indiscriminate preheating of scrap outside of the metallurgical furnace can defeat the potential time and cost savings if not done properly. For example, conventional scrap preheating methods, known heretofore, provide merely for placing the scrap in a covered or uncovered charging bucket and directly impinging a flame thereon. This limits the means of heat transfer primarily to conduction and promotes rapid oxidation of the metal surfaces being impinged upon. In addition, much of this direct flame impingement is reflected off the scrap resulting in a better heating of the roof of the chamber than the scrap itself.

Our invention provides for preheating scrap without direct flame impingement. Therefore, we do not primarily rely on conduction as a means of heat transfer but also employ convection and radiation as means of heat transfer. In addition, we provide for a scrap preheat apparatus which is very mobile and can be easily mounted on various conventional scrap loading equipment. By avoiding direct flame impingement, we minimize heat losses through reflection and keep surface oxidation to a minimum.

Our invention is a two-zone scrap preheat hood. The upper zone serves as a combustion chamber and the lower zone serves as the heat transfer chamber for transferring the heat of combustion from the combustion chamber to the scrap. A baffle extends upwardly about an opening in the floor which connects the two chambers and burners are positioned in the walls of the combustion chamber to direct their flames tangentially into the combustion chamber to an imaginary circle positioned between the inner circumference of the cylindrical walls and the outer periphery of the baffle. Various other features, objects, and advantages of the scrap preheat hood will either be specifically pointed out or become apparent when, for a better understanding of the invention, reference is made to the following description taken in conjunction with the accompanying drawings illustrating a preferred embodiment of the invention. In the drawings:

Figure 1:
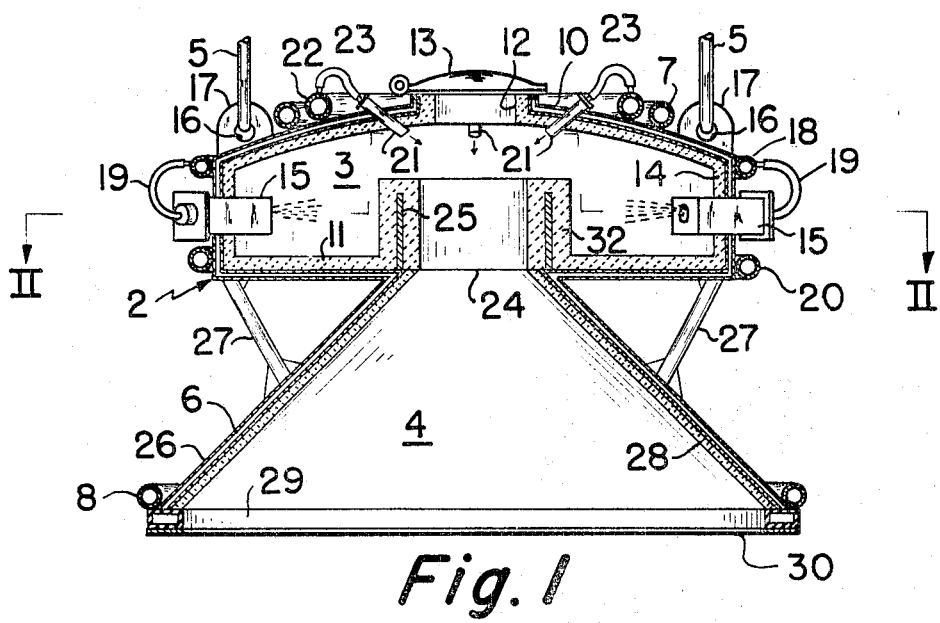
FIG. 1 is a schematic in section of the scrap preheat hood.

The scrap preheat hood comprises an outer shell 2 made of a heavy steel plate which defines two separate but connected chambers, the combustion chamber, designated generally 3, and the heat transfer chamber, designated generally 4, positioned immediately below the combustion chamber. The outer shell 2 has two upwardly extending supports 5 mounted through an eyelet 16 of plate 17 welded to opposite ends of the top of shell 2 to suspend the hood from a jib crane or monorail (not shown). This gives considerable flexibility in that the hood can be easily moved from one scrap container to another. The complete shell is cooled through passageway 6 which receives coolants such as water through header 7 positioned above the combustion chamber 2. The coolant circulates about the complete shell 2 and exits at discharge header 8 positioned near the bottom of heat transfer chamber 4. Air can be used as a coolant in which case it can be utilized as preheated air for the burner assemblies described hereinafter.

The combustion chamber 3 has a circular wall 9, a dome-shaped roof 10 attached to the top of circular wall 9 and a flat floor 11 attached to the bottom of wall 9. Of course, the roof could be integrally formed with the wall. The roof 10 has a centrally positioned opening 12 therethrough with a door 13 attached to the roof 10 to open and close the opening 12. The door 13 and opening 12 act both as a safety explosion outlet and an inspection door. The inside of chamber 3 is protected from heat by refractory lining 14 which covers the floor 11, roof 10 and wall 9.

Figure 2:
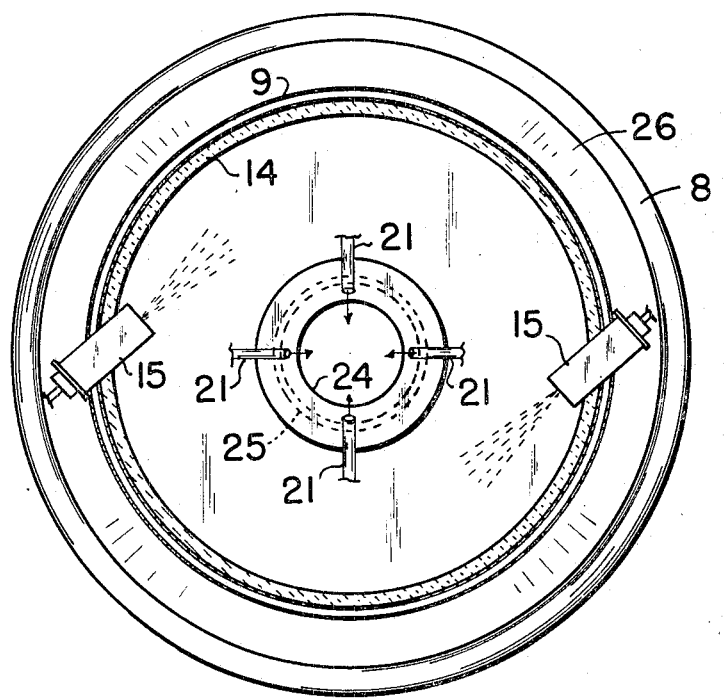
FIG. 2 is a section along section lines II—II of FIG. 1.

Two burners 15 are positioned through openings in the wall 9 at opposite sides of chamber 3. The burners 15 are mounted to direct their flames tangentially to an imaginary circle (not shown) between the inner circumference of wall 9 and the outer periphery of baffle 25 described hereinafter, see FIG. 2. The number of burners can be varied depending on the B.t.u. requirements of the unit, but the major requirement is that they be tangentially placed about the inner circumference of wall 9.

The burners are fed fuel through a fuel supply header 18 connected to each burner 15 by flexible coupling lines 19. As will be seen, flexible fuel and air lines are employed to allow maximum mobility of the unit. A combustion air supply header 20 supplies the combustion air to each burner 15.

Centrally disposed in the floor 11 of combustion chamber 3 is a circular passageway 24. Surrounding circular passageway 24 and extending upwardly into combustion chamber 3 is cylindrically-shaped baffle plate 25. Baffle plate 25 extends upwardly a distance sufficient to prevent any flame from burners 15 from entering the passageway. The tangentially directed flame actually travels for the most part between the wall 9 and the baffle plate 25. The baffle plate can be made of any material such as stainless steel which will withstand the intense heat and possible direct flame impingement. As shown in FIG. 1, the baffle plate 25 has a refractory lining 32. The volume of combustion chamber 3 is sufficient to assure complete combustion within the confines of chamber 3 to assure no actual flame carry-over into the heat transfer hood.

Four excess air jets 21 are positioned through openings in the roof 10 of the combustion chamber 3. These jets 21 are positioned at an angle to the roof and are directed toward circular passageway 24. These jets are supplied air through excess air headers 22 and flexible hosing 23 connected to the jets 21. The excess air is employed for flame tempering, that is, flame temperature regulation.

The heat transfer chamber 4 is in the shape of an open ended frustum of a cone. It is positioned below the combustion chamber 3 and is joined thereto by mounting the upper end of the heat transfer chamber about the periphery of opening 24 in the floor 11. The opening 24 cooperates with the top of the heat transfer chamber to form a connection between the two chambers. The sides 26 of heat transfer chamber 3 are additionally supported by structural members 27 attached to the sides 26 and the outer extremities of combustion chamber 3. The heat transfer chamber 4 is also lined with refractories 28. The open base 29 of heat transfer hood 4 is adapted to rest on a charging bucket (not shown) or other particular scrap hauling equipment in use. The base 29, as well as the shell 2 in general, is dimensioned to fit the particular scrap hauling equipment employed at the particular steel plant. A seal 30 positioned about the periphery of base 29 is necessary to maintain the pressures in the system to insure efficient heat transfer to the materials being heated. A sand seal such as the ones used in many commercial annealing furnaces is adequate for this purpose. The operation of the preheat hood is as follows: The preheat hood is positioned on a charging bucket or other suitable scrap hauling equipment. The burners are ignited and combustion takes place in the combustion chamber 3. A positive pressure is created in the combustion chamber 3 by the introduction of the products of combustion and the excess air. The excess air tempers the flame and regulates the heat input of the system. The positive pressure forces the heat of combustion through the opening 24 and onto the scrap to be preheated. The seal prevents loss of pressure in the system. Many charging buckets such as the clam type used for electric furnaces have sufficient openings at the bottom thereof to act as exit flues for the exhaust gases. Where such openings are not present, exit flues must be provided and can often be arranged, where necessary, with stacks and exhaust fans to expedite the movement of the exhaust gases.

A burner flame of 2500° tempered to about 2300° F. at the entrance of the heat transfer chamber will result in a temperature about 1500° F. at the top of the scrap and about 1200° F. at the bottom of the scrap. Of course, these temperatures will vary depending on the size of the preheat hood, load of scrap and size of scrap bucket. However, the excess air jets enable sufficient control of the flame temperature to maintain the ideal heating under the various conditions.

We claim:
1. A hood for preheating scrap without direct flame impingment comprising:
 (A) A refractory lined combustion chamber having a circular wall, a roof and a floor, said floor having a centrally located opening therethrough;
 (B) A baffle, said baffle extending upwardly from the floor about the centrally located opening;
 (C) At least one burner, said burner positioned through the wall of the combustion chamber to direct a flame tangentially between said wall and said baffle;
 (D) A refractory lined frustoconical heat transfer chamber open at the top and bottom ends, the top end mounted to the combustion chamber in alignment with said centrally located opening; and
 (E) Seal means, said seal means positioned about the bottom end of the heat transfer chamber and adapted to fit on scrap hauling equipment whereby combustion from said burner creates a positive pressure in the combustion chamber that forces the hot gases from the burner through said opening into the heat transfer chamber, said baffle preventing any flame from entering said opening.

2. The hood of claim 1 wherein at least one excess air jet is mounted through the roof to direct an air stream toward said opening, said air stream tempering the hot gases as they enter said opening.

3. The hood of claim 1 wherein a coolant passageway extends from a coolant inlet on the combustion chamber roof about the periphery of the combustion chamber and heat transfer chamber and exists at a coolant outlet at the base of the heat transfer chamber, said passageway having a coolant circulating therethrough.

4. The hood of claim 1 wherein said roof has an opening therethrough in alignment with said opening of the combustion floor and a door pivotably mounted on said roof to open up and close off the opening in the roof.

5. The hood of claim 1 wherein at least one support extends upwardly from said roof, said support cooperating with one of a crane and monorail to suspend said hood for ease of movement of said hood.

6. The hood of claim 3 wherein the coolant is air and a duct extends from the coolant outlet to said burners to supply preheated air thereto.

References Cited
UNITED STATES PATENTS

| | | | |
|---|---|---|---|
| 2,052,187 | 8/1936 | Mawhinney et al. | 266—5 |
| 2,944,805 | 7/1960 | Nesbitt et al. | 266—5 |
| 3,275,309 | 9/1966 | Wilson et al. | 266—5 |

GERALD A. DOST, Primary Examiner

U.S. Cl. X.R.

266—24